United States Patent [19]

Cormier, Jr. et al.

[11] Patent Number: 4,828,679

[45] Date of Patent: May 9, 1989

[54] OCTANE IMPROVEMENT WITH LARGE SIZE ZSM-5 CATALYTIC CRACKING

[75] Inventors: William E. Cormier, Jr., Ellicott City, Md.; Guenter H. Kuehl, Cherry Hill, N.J.; William A. Stover, Hampstead, N.C.

[73] Assignee: Mobil Oil Corporation, New York, N.Y.

[21] Appl. No.: 83,601

[22] Filed: Aug. 7, 1987

Related U.S. Application Data

[63] Continuation-in-part of Ser. No. 880,937, Jun. 25, 1986, abandoned, which is a continuation of Ser. No. 737,567, May 23, 1985, abandoned, which is a continuation of Ser. No. 588,253, Mar. 12, 1984, abandoned.

[51] Int. Cl.$^4$ ............................................. C10G 11/05
[52] U.S. Cl. ..................................... 208/120; 502/67; 502/71; 502/77; 502/79
[58] Field of Search ..................... 258/120; 502/67, 71, 502/77, 79

[56] References Cited

U.S. PATENT DOCUMENTS

| | | | |
|---|---|---|---|
| 3,748,251 | 7/1973 | Demmel et al. | 208/74 |
| 3,758,402 | 9/1973 | Oleck et al. | 208/111 |
| 3,758,403 | 9/1973 | Rosinski et al. | 208/120 |
| 3,886,060 | 5/1975 | Owen | 208/120 |
| 3,894,934 | 7/1975 | Owen | 208/71 |
| 3,966,586 | 6/1976 | Owen et al. | 208/78 |
| 3,968,024 | 7/1976 | Gorring et al. | 502/77 |
| 4,002,557 | 1/1977 | Owen et al. | 208/120 |
| 4,100,262 | 7/1978 | Pelrine | 423/329 |
| 4,117,026 | 9/1978 | Haag et al. | 585/411 |
| 4,176,050 | 11/1979 | Chen et al. | 288/120 |
| 4,239,654 | 12/1980 | Gladrow et al. | 208/120 |
| 4,289,606 | 9/1981 | Gladrow et al. | 208/120 |
| 4,309,279 | 1/1982 | Chester et al. | 208/135 |
| 4,309,280 | 1/1982 | Rosinski et al. | 208/120 |
| 4,326,994 | 4/1982 | Haag et al. | 502/64 |
| 4,340,465 | 7/1982 | Miller et al. | 208/120 |
| 4,359,378 | 11/1982 | Scott | 208/120 |
| 4,368,114 | 1/1983 | Chester et al. | 208/113 |
| 4,418,235 | 11/1983 | Haag et al. | 585/467 |
| 4,490,241 | 12/1984 | Chou | 208/75 |
| 4,521,298 | 6/1985 | Rosinski et al. | 208/120 |
| 4,522,705 | 6/1985 | Chu et al. | 208/120 |
| 4,549,956 | 10/1985 | Chu | 502/67 |
| 4,550,218 | 10/1985 | Chu | 208/120 |
| 4,552,648 | 11/1985 | Rosinski et al. | 208/120 |
| 4,575,416 | 3/1986 | Chester et al. | 208/120 |
| 4,585,638 | 4/1986 | Kühl | 502/62 |

FOREIGN PATENT DOCUMENTS 21674 1/1981 European Pat. Off. ............. 502/77

*Primary Examiner*—Anthony McFarlane
*Attorney, Agent, or Firm*—Alexander J. McKillop; Charles J. Speciale; Malcolm D. Keen

[57] ABSTRACT

Octane and total yield improvement in catalytic cracking of petroleum fractions under cracking conditions can be obtained by adding to conventional cracking catalysts small amounts of an additive catalyst comprising a class of zeolites characterized by a silica to alumina mole ratio greater than 12 and a constraint index of 1 to 12 wherein the zeolite additive catalyst has a crystal size of between 0.2 to 10 microns.

32 Claims, No Drawings

OCTANE IMPROVEMENT WITH LARGE SIZE ZSM-5 CATALYTIC CRACKING

CROSS REFERENCE TO RELATED APPLICATIONS

This is a continuation-in-part of application Ser. No. 880,937, filed June 25, 1986 and now abandoned, which is a continuation of application Ser. No. 737,567, filed May 23, 1985 and now abandoned, which is a continuation of application Ser. No. 588,253, filed on Mar. 12, 1984 and now abandoned. The Europoean filing of the latter application was published Oct. 2, 1985 as EPA No. 156,490.

BACKGROUND OF THE INVENTION

1. Field of the Invention

This invention relates to a novel catalytic cracking process to produce motor fuels. In particular, this invention relates to an improved catalytic cracking process for producing motor fuel involving the use of a catalyst such as large crystallite ZSM-5 in conjunction with a conventional zeolite-containing cracking catalyst to thereby increase gasoline octane number and gasoline plus alkylate yield.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a mixture for catalytic cracking and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a large pore size crystalline zeolite (pore size greater than 8 Angstrom units) has indeed been very effective with respect to raising of octane number, nevertheless, it did so at the expense of the overall yield of gasoline.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 type zeolite to large poe size crystalline zeolite was in the range of 1:10 to 3:1. Effective cracking processes were disclosed as being achieved when the catalyst was used to obtain the inherent advantages realized in moving bed techniques, such as the Thermofor catalytic cracking process (TCC) as well as in fluidized cracking processes (FCC).

U.S. Pat. No. 3,758,403 is silent as to the crystallite size of the ZSM-5 employed. It does mention at Column 3, lines 25-31, that ZSM-5 is disclosed in application Ser. No. 865,472, filed Oct. 10, 1969, which is now U.S. Pat. No. 3,702,886. U.S. Pat. No. 3,702,886 contains examples which are silent as to crystalline size, e.g., Example 1. It also contains examples wherein the crystallite size of ZSM-5 is on the order of 1 micron, e.g., Example 2; examples wherein the crystallite size is less than 1 micron (Example 26) and Examples wherein the ZSM-5 has a crystallite size of 8 X 20 microns and "some large cubes to 25 microns" (Example 27).

U.S. Pat. No. 3,758,403 does contain a disclosure as to particle size of "each type of zeolite making up the catalyst system" (Col. 9, lines 25-31) but particle size and crystalline size are separate and distinct properties—as will be further explained.

The use of ZSM-5 type zeolites in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite within the range of 1:10 to 3:1.

The addition of a separate additive catalyst comprising one or more members of the ZSM-5 type has been found to be extremely efficient as an octane and total yield improves when used in very small amounts in conjunction with a conventional cracking catalyst. Thus, in U.S. Pat. No. 4,309,279, it was found that only 0.1 to 0.5 weight percent of a ZSM-5 type catalyst added to a conventional cracking under conventional cracking operations could increase octane by about 1 to 3 RON+O (research octane number without lead).

Said U.S. Pat. No. 4,309,279 is silent as to the crystalline size of the ZSM-5 used.

U.S. Pat. No. 4,309,280 also teaches ZSM-5 and other zeolites in conjunction with a conventional cracking catalyst. The ZSM-5 is stated in Examples 10-13 to have a crystalline size of 0.02 to 0.05 microns.

Prior to the instant invention it had always been believed that smaller crystallite size ZSM-5 was better than a larger crystallite size material because of the fact that the smaller crystallite size aged more slowly. This is reflected in patents such as U.S. Pat. Nos. 3,761,226 and 3,926,782.

U.S. Pat. No. 3,781,226 discloses at Column 1, lines 43-47 that "numerous material and synthetic zeolites, especially crystalline aliminosilicate zeolites, have been used for various organic compound conversion reactions. These natural or synthetic zeolites generally exist in a particle size range above 1 micron." Said patent points out the improved benefits resulting from using zeolites, including ZSM-5, which have particle size of between 0.005 microns and 0.3 microns (Column 4, lines 10-14). Although the patent stresses particle size as opposed to crystallite size; nevertheless, ZSM-5 having a crystallite size of 0.04 micron is disclosed in Example 2.

U.S. Pat. No. 3,926,782 teaches ZSM-5 type crystals for hydrocarbon conversion having an ultimate particle diameter of 0.005 to 0.1 micron as crystallized and specifically points out that these small crystallite materials age at a slower rate in various hydrocarbon conversion processes including catalytic cracking (Column 4, lines 57-65). At Column 6, lines 12-18, the patent states that catalysts made with small size ZSM-5 crystals (0.005-0.1 micron in ultimate particle, i.e., individual crystallite diameter) have been found to age at a significantly slower rate than corresponding ZSM-5 containing catalysts of appreciably larger crystallite size (0.1–0.5 micro in ultimate particle, i.e., individual crystallite diameter).

The difference between crystallite size, i.e., the size of the individual crystal and particle size, i.e., the size of the many crystals which have agglomerated due to surface forces is best illustrated in Example 21 of said patent. In said Example, the ZSM-5 had a particle size of 0.25–0.5 microns in diameter whereas the individual crystallites were about 0.02 microns in diameter. As has heretofore been stated, this invention is concerned with crystalline size, i.e., the size of the individual crystals.

Large crystallite size ZSM-5 type zeolites are known in the art and in this connection U.S. Pat. No. 4,375,458 teaches materials having a crystal size at least 1 micron. U.S. Pat. No. 4,100,262 teaches ZSM-5 crystals having a size between $5 \times 10$ microns and $10 \times 20$ microns including their use in cracking. U.S. Pat. No. 4,117,026 discloses crystalline aluminosilicate zeolites including ZSM-5 having a crystallite size of greater than about 0.5 microns generally in the approximate range of 1–20 microns and particularly 1–6 microns, i.e., Column 4, lines 42–46. However, the patent is silent as to the use of these materials for catalytic cracking of gas oils in order to produce hydrocarbons boiling in the motor fuel range.

In order to reduce automobile exhaust emissions to meet federal and state pollution requirements, many automobile manufacturers have equipped the exhaust system of their vehicles with catalytic converters. Said converters contain catalysts which are poisoned by tetraethyl lead. Since tetraethyl lead has been widely used to boost the octane number of gasoline, refiners now have to turn to alternate means to improve gasoline octane number.

One method of increasing octane numbers is to raise the cracker reactor temperature. This method, however, is very limited, since many units are now operating at maximum temperatures due to metallurgical limitations. Raising the cracker reactor temperature also results in increased requirements for the gas plant (i.e., gas compressor and separator). Since most gas plants are now operating at maximum capacity, any increased load could not be tolerated by the present equipment.

An alternative method has been to mix an additive catalyst such as ZSM-5 to the cracking catalyst as described above. Generally, the octane gain for ZSM-5 containing cracking catalyst is associated with gasoline ($C_5+$) yield decrease and correspondingly higher yields of $C_3$ and $C_4$ gaseous products.

As can well be appreciated in the foregoing, it would be extremely desirable to have a process which will provide high octane unleaded gasoline without undue sacrifice of gasoline yield.

SUMMARY OF THE INVENTION

It has now been discovered that an improved process to obtain the octane number and total motor fuel yield in catalytic cracking units can be achieved by using a zeolite such as ZSM-5 having a crystal size of from 0.2 to 10 microns and preferably from 0.2 to 5 microns and even more desirably from 0.3 to 3 microns. In accordance with this invention, a zeolite such as ZSM-5 having a crystal size within the above range is added to a conventional zeolite-containing cracking catalyst and a hydrocarbon fuel such as a gas oil is cracked under conventional cracking conditions. It has been found that the large crystallite size ZSM-5 zeolite employed in the process of this invention is more steam stable than corresponding smaller crystallite size materials even though their susceptibility to coke aging might be greater. In other words, the novel process of this invention is limited to use in those catalytic conversion processes such as catalytic cracking where the catalyst is used in such a manner that it comes into contact with steam at elevated temperatures. The steam may be present in the feed, produced as a reaction product, added to remove products and unreactive feed from the catalyst or generated during regeneration. The net result is an irreversible loss of catalytic activity. In coke aging, however, the catalyst can be restored to almost its fresh activity by conventional regeneration techniques where the carbonaceous coke deposits are removed by burning at elevated temperatures. The relative importance of coke aging versus steam deactivation depends on the particular process involved. In a process such as catalytic cracking, steam stability is far more important than coke aging. Thus in fluid cracking, the catalyst spends over about 80% of the total residence time in the regenerator at elevated temperatures in the presence of steam. As can well be appreciated, the use of the material which has enhanced steam stability will provide improved benefits when employed in catalytic cracking process, i.e., for the preparation of gasoline.

The novel process of this invention is concerned with the crystallite size of a crystalline aluminosilicate zeolite such as ZSM-5. For the assessment of crystal size, conventional scanning electron microscopy (SEM) or transmission electron microscopy (TEM) techniques can be used. The minimum crystal dimension of a given crystal being taken as the dimension of reference. It is also contemplated that the amount of zeolite of such crystal size will be such as to exert a directive influence on the desired production of gasoline. Generally, the amount of zeolite of such crystal size will present in predominant proportion, i.e., amount exceeding 50 wt. percent and preferably may constitute up to 100 wt. percent of the total zeolite employed.

DESCRIPTION OF THE PREFERRED EMBODIMENTS

It has now been discovered that improved results can be obtained in the catalytic cracking of gas oil with respect to both octane number and overall yield if the gas oil is cracked utilizing a catalyst composition comprising a conventional cracking catalyst containing a large pore crystalline aluminosilicate, preferably zeolite Y, in admixture with a novel class of crystalline aluminosilicate such as ZSM-5. The manner in which a ZSM-5 (or other) zeolite is associated with the conventional cracking catalyst is not narrowly critical and it can be physically admixed therewith as part of the same particle or it can be present as separate particles. ZSM-5 can be incorporated with a separate matrix and the cracking catalyst can be incorporate in a separate matrix. They can be incorporated in the same matrix.

It is to be understood that this invention is not concerned with the addition of ZSM-5 or similar zeolites to a cracking unit which does not contain a large pore zeolite such as zeolite Y. Thus, ZSM-5 alone or in admixture with an amorphous cracking catalyst such as silica-alumina simply is not practical for use in a commercial cracking operation to produce motor fuels from gas oils. The novel process of this invention requires a large pore zeolite, i.e. greater than 8 Angstrom units such as zeolite X or zeolite Y. The particularly preferred zeolite is zeolite Y including its "ultrastable" form.

As a practical matter, the ZSM-5 is usually added as a separate additive catalyst. ZSM-5 zeolite is added as a separate additive catalyst in extremely small amounts which can range from 0.1 to 10 wt. percent and higher, such as up to 20 wt. percent or 50 wt. percent, based on total catalyst inventory.

Since the zeolites of the additive catalyst are very active catalytically in the fresh state, only very small quantities are necessary to obtain substantial octane improvement in a commercial cracking unit. Thus the refiner is afforded great flexibility in commercial cracking operation, since the additive catalyst can be quickly introduced, because such a small quantity is required as compared to the total inventory of catalyst. The refiner can efficiently control the magnitude of octane increase by controlling the rate of additive catalyst. This type of flexibility could be useful in situations where feed composition or rate changes occur, when demand for high octane gasoline (unleaded) fluctuates, or when capacity for alkylation varies due to mechanical problems or changes in overall refinery operation.

It is clear from the foregoing that octane gain can be controlled to the extent desired by the introduction of only very small amounts of additive catalyst. In commercial practice, the octane gain could be maximized or controlled to operate at maximum light gas handling capability or full alkylation capacity.

On extremely important benefit of the novel process of this invention is that less large crystallite size ZSM-5 is required to accomplish a given objective than the corresponding small crystallite size ZSM-5.

It is pointed out that the amount of ZSM-5 added to the total catalyst inventory varies depending on many factors such as the nature of the feed, the performance limitations of the particular cracking unit, the light olefins desired, etc. However, in order to get the same benefit less large crystallite size ZSM-5 is required than the smalller crystallite size material. In view of the fact that ZSM-5 is relatively expensive material, the instant process has a decided economic advantage.

The additive catalyst can be introduced at any time during the catalytic cracking process. The additive catalyst can be introduced while the cracking unit is down, or while the cracking unit is on-stream operation. One the additive catalyst is added to the cracking process, the refiner can return to conventional operation or an operation at lower octane number by eliminating or decreasing the use of additive catalyst. Thus the increase in octane number over the number obtainable under conventional cracking operations can be controlled by controlling the amount of additive catalyst.

Catalytic cracking units which are amenable to the process of this invention operate within the temperature range of about 400° F. to 1300° F. and under reduced atmospheric or superatmospheric pressure. The process of this invention is applicable to the fluidized catalytic cracking (FCC) process or the Thermofor catalytic cracking (TCC) process. The FCC process uses a fluidized bed of catalyst while the TCC process uses a moving bed of catalyst.

The amount of additive catalyst required to increase gasoline octane number is generally based on the total quantity of conventional cracking catalyst in the unit, i.e., on the circulating inventory of convention cracking catalyst. For example, if the additive catalyst is first introduced via the addition of fresh makeup catalyst, the amount of zeolite constituent in the additive catalyst required would be quite high if compared against the amount of fresh makeup catalyst added. However, after a period of time of fresh makeup catalyst addition, and once the amount of zeolite in the additive catalyst is maintained at the prescribed limits as compared to the circulating inventory of conventional cracking catalyst, the amount of said zeolite in the fresh makeup catalyst addition will be much lower than initially.

A recent advance in the art of catalytic cracking is disclosed in U.S. Pat. No. 4,072,600, the entire contents of which are incorporated herein by reference. One embodiment of this aforesaid patent teaches that trace amounts of a metal selected from the group consisting of platinum, palladium, iridium, osmium, rhodium, ruthenium and rhenium when added to cracking catalysts enhance significantly conversion of carbon monoxide during the catalyst regeneration operation.

In employing this recent advance to the present invention, the amount of said metal added to the conventional cracking catalyst can vary from between about 0.01 ppm and about 100 ppm based on total catalyst inventory. The aforesaid metals can also be introduced into the process via the additive catalyst in amounts between about 1.0 ppm and about 1000 ppm based on total additive catalyst.

After cracking, the resulting product gas is compressed and the resulting products may suitably be separated from the remaining components by conventional means such as adsorption, distillation, etc.

Hydrocarbon charge stocks undergoing cracking in accordance with this invention comprise hydrocarbons generally and, in particular, petroleum fractions having an initial boiling point range of at least 400° F., a 50% point range of at least 500° F. and an end point range of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The members of the class of zeolites of the additive catalyst of this invention are characterized by a pore dimension greater than about 5 Angstroms, i.e., it is capable of sorbing paraffins having a single methyl branch as well as normal paraffins, and it has a silica to alumina mole ratio of at least 12. Zeolite A, for example, with a silica to alumina ratio of 2.0, is not useful in this invention, and moreover it has no pore dimension greater than about 5 Angstroms.

The members of the class of zeolites of the additive catalyst constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

The additive catalysts referred to herein utilize members of a class of zeolites exhibiting some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina mole ratios, they are very active even with silica to alumina mole ratios exceeding 30. This activity is surprising, since catalytic activity of zeolites is generally attributable to framework aluminum atoms and cations associated with these aluminum atoms. These zeolites retain their crystallinity for long periods in spite of the presence of stream even at high temperatures which induce irreversible collapse of the crystal framework of other zeolites, e.g, of the X and A type. Furthermore, carbonaceous deposits, when formed, may be removed by burning at higher than usual temperatures to restore activity. In many environments, the zeolites of this class exhibit very low coke forming capability, conducive to very long times on-stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetradhedra making up the anionic framework of the crystalline zeolite, the oxygen atoms themselves being bonded to the silicon or aluminum atoms at the centers of the tetrahedra. Briefly, the preferred zeolites useful in the additive catalysts of the invention possess, in combination: A Constraint Index, (as defined in U.S. Pat. No. 4,309,279, the disclosure of which is incorporated by reference) of about 1 to 12, a silica to alumina mole ratio of at least about 12, and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although additive catalysts comprising zeolites with a silica to alumina mole ratio of at least 12 are useful, it is preferred to use zeolites having higher ratios of at least about 30. In some zeolites, the upper limit of silica to alumina mole ratio is unbounded, with values of 30,000 and greater. Such zeolites after activation, acquire intracrystalline sorption capacity for normal hexane which is greater than that for water, i.e., they exhibit "hydrophobic" properties. It is believed that this hydrophobic character is advantageous in the present invention.

The zeolite comprising the additive catalysts in this invention freely sorb normal hexane and have a pore dimension greater than about 5 Angstroms. In addition, their structure must provide constrained access to some large molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Additive catalysts with zeolites with windows of 10-membered rings are preferred, although excessive puckering or pore blockage may render these zeolites substantially ineffective. Additive catalysts comprising zeolites with windows of 12-membered rings do not generally appear to offer sufficient constraint to produce the advantageous conversions desired in the instant invention, although structures can be conceived, due to pore blockage or other cause, that may be operative.

The members of the class of zeolites defined herein of the additive catalyst are exemplified by ZSM-5, ZSM-11, ZSM-12, ZSM-23, ZSM-35, ZSM-38 and other similar materials. Recently issued U.S. Pat. No. 3,702,886, describing and claiming ZSM-5, is incorporated herein by reference. Also, U.S. Pat. No. Re. 29,948, describing and claiming a crystalline material with an X-ray diffraction pattern of ZSM-5, is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in U.S. Pat. No. 4,397,827, the entire contents of which are incorporated herein by reference.

Natural zeolites may sometimes be converted to this class of zeolites by various activation procedures and other treatments such as gas exchange, steaming, alumina extraction and calcination, alone or in combinations. Natural minerals which may be so treated include ferrierite, brewsterite, stilbite, dachiardite, epistilbite, heulandite and clinoptilite. The preferred zeolites of the additive catalyst are ZSM-5, ZSM-11, ZSM-12, ZSM-23, ZSM-35 and ZSM-38, with ZSM-5 particularly preferred.

The zeolites used in additive catalysts in this invention may be in the hydrogen form or they may be base exchanged or impregnated to contain a rare earth cation compliment. Such rare earth cations comprise Sm, Nd, Pr, Ce and La. It is desirable to calcine the zeolite after base exchange.

As is the case of many catalyst, it is desirable to incorporate the zeolite component of the additive catalyst in a matrix. Some matrix is useful as a binder and imparts greater resistance to the catalyst for the severe temperature, pressure and velocity conditions encountered in many cracking processes.

Matrix materials include both synthetic and natural substances. Such substances include clays, silica and/or metal oxides. The latter may be either naturally occurring or in the form of gelatinous precipitates, sols or gels including mixtures of silica and metal oxides.

In addition to the foregoing materials, the zeolite for use herein can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogles to form a matrix is highly preferred.

In addition to the large pore zeolite such as Zeolite Y, conventional cracking catalysts contain other components such as silica-alumina, clays, etc. However, the major conventional cracking catalysts presently in use generally comprise a crystalline zeolite (active component) in a suitable matrix. Representative crystalline zeolite active component constituents of conventional cracking catalysts include zeolite Z (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occurring zeolites, including chabazite, faujasite, mordenite, and the like. Preferred crystalline zeolites include the synthetic faujasite zeolites X and Y, with particular preference being accorded zeolite Y.

The particle size of the individual component particles may be quite small, for example from about 20 to about 150 microns.

The crystalline zeolite employed as a constituent in the cracking catalyst compositions of the present invention is essentially characterized by a high catalytic activity.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, sulfate, chloride or nitrate.

Where a matrix is used, content of crystalline zeolite, i.e., the amount of the zeolite Y component, is generally between about 5 and about 50 weight percent. Ion exchange of the zeolite to replace its initial alkali metal content can be accomplished either prior to or subsequent to incorporation of the zeolite into the matrix.

The above compositions may be readily processed so as to provide fluid cracking (FCC) catalysts by spray drying the composite to form microspheroidal particles of suitable size or by formation into suitable beads or pellets for TCC.

It is to be noted that although steam stability of the additive zeolites such as ZSM-5 icreases with increasing crystallite size nevertheless other desirable attributes of a catalyst, such as attrition resistance, actually decreases. Thus, too large a crystallite size is not desirable since many factors must be considered in developing a catalyst suitable for use in commercial operation and the ability to withstand attrition is certainly an important consideration. Thus a crystallite size above the ranges set forth would result in the loss of necessary physical properties.

In additin, it is highly preferred that the maximum dimension in any direction for the ZSM-5 (or other additive zeolites) be no greater than 20 Angstrom units in order to obtain acceptable attrition resistance.

The following examples will illustrate the novel process of this invention and it is understood that the disclosure of all patents mentioned in the specification and examples is hereby incorporated by reference.

EXAMPLE 1

A fluid catalyst matrix containing 93% $SiO_2$/7% $Al_2O_3$ was prepared by first mixing 1150 parts by weight of water and 242 parts of sodium-silicate (28.8% wt $SiO_2$, 8.9% wt $Na_2O$) and maintaining at 50°–60° F. Then, 10.7 parts of concentrated sulfuric acid (97.3% wt) was added to the mixture at a uniform rate over a 30 minute period. Next, a solution prepared by dissolving 30.5 parts of $Al_2(SO_4)_3 \cdot xH_2O$ (17.2% wt $Al_2O_3$) in 122 parts of water was added uniformly over a 30 minute period. The temperature of the resulting $SiO_2/Al_2O_3$ gel was maintained at 50°–60° F. by the addition of 85 parts by weight of ice. Finally, the pH of the gel was adjusted to 4.5 by adding concentrated sulfuric acid.

To the resulting gel, a sufficient quality of ZSM-5 zeolite (0.02–0.05 micron crystal size) was added to give 25% by weight on a dry basis. The mixture was then filtered to remove dissolved salts, reslurried with water to 8.5% solids by weight, homogenized and spray dried at 700° F. inlet temperature, 350° F. outlet temperature.

The resultant spray dried product was exchanged with a 5% $(NH_4)_2SO_4$ solution, water washed until the effluent was $SO_4=$free and dried for at least 16 hours at 250° F. The sodium content of the final product was 0.03% wt.

EXAMPLE 2

A fluid catalyst matrix containing 93% $SiO_2$/7% $Al_2O_3$ was prepared by first mixing 1150 parts by weight of water and 242 parts of sodium silicate (28.8% wt $SiO_2$, 8.9% wt $Na_2O$) and maintained at 50°–60° F. Then 17.7 parts of concentrated sulfuric acid (97.3% wt) was added to the mixture at a uniform rate over a 30 minute period. Next, a solution prepared by dissolving 30.5 parts of $Al_2(SO_4)_3 \cdot xH_2O$ (17.2% wt $Al_2O_3$) in 122 parts of water was added uniformly over a 30 minute period. The temperature of the resulting gel was maintained at 50°–60° F. by the addition of 68 parts by weight of ice. Finally, the pH of the gel was adjusted to 4.5 by the addition of concentrated sulfuric acid.

To the resulting gel, a sufficient quantity of ZSM-5 zeolite (0.2–0.5 micron crystals), a larger crystal size than used in Example 1, was added to give 25% by weight on a dry basis. The mixture was then filtered to remove dissolved salts, reslurried with water to 9% solids by weight, homogenized and spray dried at 700° F. inlet temperature, 350° F. outlet temperature.

The resultant spray dried product was ion exchanged with a solution containing 1% wt $NH_4Cl$ and 2% wt $Al_2(SO_4)_3$, water washed until both $SO_4=$and $Cl^-$free and dried for at least 16 hours at 250° F. The sodium content of the final product was 0.08% weight.

The ZSM-5 containing additive catalysts described in Examples 1 and 2, along with Super-D, a commercially available cracking catalyst containing Zeolite Y manufactured by the Davison Division of W. R. Grace & Company, were steamed for 10 hours at 1450° F. inn 45% steam/55% air, 0 psig atmospheric to simulate the hydrothermal deactivation they would undergo during use in a regenerator of a cracking unit. Sufficient qualities of steamed ZSM-5 additives were combined with the steamed Super-D in proportion to give ZSM-5/cracking catalyst combinations containing 2 wt % of the small and larger crystal size ZSM-5. These mixtures along with the steamed Super-D base catalyst were catalytically evaluated in a fixed-fluidized bed unit at 960° F. initial temperature, 1.0 minutes on-stream, 3 C/O, 20 WHSV, using Joliet Sour Heavy Gas Oil (JSHGO) as feed. The catalytic results, which are averages of at least two runs, are summarized in the following table.

| Catalyst<br>ZSM-5 Crystal Size | Super-D<br>(Base)<br>— | +2% ZSM-5<br>Example 1<br>0.02–0.05 | +2% ZSM-5<br>Example 2<br>0.2–0.5 |
|---|---|---|---|
| Conversion, % Vol | 68.7 | 68.8 | 67.5 |
| $C_5^+$ Gasoline, % Vol | 54.1 | 53.5 | 52.0 |
| Total $C_4$'s, % Vol | 15.6 | 16.3 | 15.9 |
| Dry Gas, % Wt | 7.7 | 7.9 | 7.9 |
| Coke, % Wt | 4.1 | 4.2 | 4.1 |
| i-$C_4$, % Vol | 7.2 | 7.6 | 7.5 |
| $C_4^=$, % Vol | 6.4 | 6.7 | 6.4 |
| $C_3^=$, % Vol | 7.0 | 7.1 | 7.5 |
| $C_5^+$ Gasoline + Potential Alkylate, % Vol | 76.4 | 76.4 | 74.9 |
| Outside i-$C_4$, % Vol | 8.1 | 8.0 | 8.1 |
| RON + O, $C_5^+$ Gasoline | 87.2 | 87.7 | 88.1 |
| RON + O, $C_5^+$ Gasoline + Alkylate | 89.2 | 89.6 | 89.9 |

The larger crystal size ZSM-5 (from Example 2) retained more of its octane enhancement capacity after the steam treatment, indicating greater stability. This is corroborated by the larger gasoline yield loss associated with it. In a commercial operation, a refiner could lower the make-up rate of a larger crystal size ZSM-5 catalyst to achieve the required gasoline octane from the cracking unit or at the same makeup rate as with a smaller crystal size ZSM-5 catalyst, he could achieve a higher octane gasoline production.

To further substantiate the greater stability of the larger crystal size ZSM-5, the ZSM-5 catalysts of Examples 1 and 2 and the base Super-D catalyst were given an even more severe steam treatment: 25 hrs. at 1450° F., in 45% steam/55% air, 0 psig atmosphere. As in the previous study, composite catalysts containing 2% ZSM-5 of both the larger and smaller size crystals were prepared. Catalytic evaluations were identical conditions as the previous study except that the C/O ratio ws adjusted to 5, and hence the WHSV to 12 to counteract the lower overall activity of the catalysts. The results are summarized below and again are the average of at least two runs.

| | Severe Steaming Catalytic Results | | |
|---|---|---|---|
| Catalyst<br>ZSM-5 Crystal Size | Super D<br>(Base)<br>— | +2% SSM-5<br>Example 1<br>0.02–0.05 | +2% ZSM-5<br>Example 2<br>0.2–0.5 |
| Conversion, % Vol | 69.5 | 67.0 | 68.8 |
| $C_5^+$ Gasoline, % Vol | 54.4 | 52.5 | 52.1 |
| Total $C_4$'s, % Vol | 16.1 | 15.2 | 16.7 |
| Dry Gas, % Wt | 8.0 | 7.5 | 8.4 |
| Coke, % Wt | 3.9 | 3.9 | 4.2 |
| i-$C_4$, % Vol | 7.1 | 6.8 | 7.5 |
| $C_4^=$, % Vol | 6.9 | 6.5 | 7.4 |
| $C_3^=$, % Vol | 7.6 | 7.4 | 7.9 |
| $C_5^+$ Gasoline + Potential Alkylate, | 78.6 | 75.5 | 77.4 |

-continued

| | Severe Steaming Catalytic Results | | |
|---|---|---|---|
| Catalyst<br>ZSM-5 Crystal Size | Super D<br>(Base)<br>— | +2% SSM-5<br>Example 1<br>0.02–0.05 | +2% ZSM-5<br>Example 2<br>0.2–0.5 |
| % Vol | | | |
| Outside i-$C_4$, % Vol | 9.3 | 9.0 | 9.8 |
| RON + O, $C_5^+$ Gasoline | 87.8 | 88.0 | 89.3 |
| RON + O, $C_5^+$ Gasoline + Alkylate | 89.7 | 89.8 | 90.8 |

These severe steam results clearly show the superior steam stability of the larger size ZSM-5 crystals. The small ZSM-5 crystals lost virtually all octane enhancement capability while the larger crystals maintained approximately 1 RON+O advantage over the base catalyst. The lower gasoline yield and higher $C_3$ and $C_4$ gas yields at a slightly lower conversion are further evidence of greater ZSM-5 activity.

EXAMPLE 3

Previous work on ZSM-5 addition in FCC such as described and claimed in U.S. Pat. No. 4,309,279 reported significant octane gains with the addition of relatively small quantities of fresh ZSM-5. The results of these experiments is again to demonstrate the effect of steam deactivation on a large crystal ZSM-5. Both additive catalysts contain 25% ZSM-5 having a crystallite size of 0.1–0.5 microns in a 93/7 $SiO_2/Al_2O_2/Al_2O_3$ hydrogel matrix. Two levels of ZSM-5 were employed: 0.25 wt percent for the fresh ZSM-5 and 2 wt percent for the steamed ZSM-5. The results are shown below in Table 1.

TABLE 1

Comparison[1] of Fresh and Steamed[2] ZSM-5 in Equilibrium HEZ-53 at Constant 4.0 Cat/Oil (15 WHSV hr$^{-1}$).

| | Equil.<br>HEZ-53 | +0.25%<br>Fresh<br>ZSM-5[3] | +2.0% Stmd<br>ZSM-5[3] |
|---|---|---|---|
| Conversion, % Vol | 59.8 | 61.3 | 58.4 |
| Product Yields | | | |
| $C_5^+$ Gasoline, % Vol | 49.1 | 40.1 | 46.7 |
| Total $C_4$'s, % Vol | 11.3 | 18.3 | 12.5 |
| Dry Gas, % Wt | 6.1 | 11.9 | 6.5 |
| Coke, % Wt | 3.7 | 4.1 | 3.7 |
| LFO, % Wt | 35.1 | 31.3 | 35.2 |
| HFO, % Wt | 7.3 | 7.9 | 8.2 |
| G + D, % Wt | 75.6 | 64.3 | 73.5 |
| n-$C_4$, % Vol | 1.0 | 1.1 | 1.0 |
| i-$C_4$, % Vol | 4.0 | 6.3 | 4.0 |
| $C_4^=$, % Vol | 6.4 | 10.9 | 7.5 |
| $C_3$, 5% Vol | 1.1 | 2.3 | 1.0 |
| $C_3^=$, % Vol | 5.6 | 13.7 | 6.8 |
| Potential Alkylate Yields | | | |
| Alkylate, % Vol | 20.1 | 40.9 | 23.9 |
| $C_5^+$ Gasoline + Alkylate, % Vol | 69.1 | 80.9 | 70.6 |
| Outside i-$C_4$, % Vol | 9.1 | 21.5 | 12.1 |
| Octane Number RON+O: | | | |
| $C_5^+$ Gasoline | 88.4 | 92.1 | 89.8 |
| $C_5^+$ Gasoline + Alkylate | 90.6 | 93.0 | 91.3 |

[1]Fixed-Fluidized Bed Bench Unit, 1.0 Minute On-Stream. Reaction Temperature: 960° F.; Feed: JSHGO
[2]Steamed 10 hrs, 1450° F., 44/55 Steam/air, 0 psig
[3]0.2–0.5 micron crystallite size

EXAMPLES 4 AND 5

In order to further demonstrate the improved benefits resulting from the use of large crystallite ZSM-5, experiments were run on a 0.5 barrel per day, pilot plant, utilizing a ZSM-5 having a crystallite size of 0.02 to 0.05 microns and a ZSM-5 having a crystallite size of 0.2 to 0.5 microns. In all evaluations the additive catalyst containing 25% high-solids, low-sodium ZSM-5 in a 93/7 silica to alumina hydrogen matrix were added to give an initial fresh ZSM-5 level of 3.5 wt percent in the catalyst inventory with no catalyst added thereafter. Data indicates significant octane improvements for both ZSM-5 catalysts initially, with the ZSM-5 of larger crystallite size retaining its steamed stability more effectively than the smaller crystallite material. These results are shown in Tables 2 and 3.

TABLE 2

ZSM-5 (0.2–0.5 micron crystallite size) Distillate Mode Yield
From 0.5 BPD Pilot Plant Study

| Base FCC Catalyst | Equilibrium HEZ-53 | | | | | | | | | | | |
|---|---|---|---|---|---|---|---|---|---|---|---|---|
| Time on stream, hrs. | Base Case | | 6 | | 51 | | 74 | | 136 | | 347 | |
| Operating Conditions: | | | | | | | | | | | | |
| Riser Top Temp °F. | 940 | | 947 | | 940 | | 939 | | 946 | | 946 | |
| Regen Temp, °F. | 1348 | | 1352 | | 1369 | | 1366 | | 1341 | | 1332 | |
| CFR | 1.5 | | 1.5 | | 1.5 | | 1.5 | | 1.5 | | 1.5 | |
| c/o | 4.5 | | 4.2 | | 4.5 | | 4.4 | | 4.3 | | 4.2 | |
| Conversion (Vol %) | 48.8 | | 54.3 | | 54.1 | | 53.6 | | 51.1 | | 49.5 | |
| Product Yields, % | Wt | Vol | Wt | Vol | Wt | Vol | Wt | Vol | Wt | Vol | Wt | Vol |
| $H_2S$ | 1.18 | — | 1.08 | — | 1.19 | — | 1.23 | — | 1.19 | — | 1.17 | — |
| $H_2$ | 0.13 | — | 0.13 | — | 0.15 | — | 0.16 | — | 0.15 | — | 0.16 | — |
| $C_1$ | 0.79 | — | 0.75 | — | 0.79 | — | 0.84 | — | 0.80 | — | 0.80 | — |
| $C_2$ | 1.25 | — | 1.51 | — | 1.26 | — | 1.33 | — | 1.35 | — | 1.33 | — |
| $C_3$ | 0.68 | 1.24 | 1.02 | 1.87 | 0.82 | 1.50 | 0.85 | 1.55 | 0.80 | 1.45 | 0.73 | 1.33 |
| $C_3=$ | 2.82 | 5.01 | 6.83 | 12.12 | 4.61 | 8.19 | 4.30 | 7.62 | 3.78 | 6.70 | 2.88 | 5.11 |
| $i-C_4$ | 1.03 | 1.70 | 1.46 | 2.40 | 1.30 | 2.14 | 1.31 | 2.15 | 1.06 | 1.75 | 0.97 | 1.59 |
| $n-C_4$ | 0.41 | 0.66 | 0.52 | 0.83 | 0.46 | 0.72 | 0.46 | 0.73 | 0.44 | 0.69 | 0.51 | 0.80 |
| $C_4=$ | 4.23 | 6.44 | 8.13 | 12.39 | 6.51 | 9.91 | 6.01 | 9.15 | 5.52 | 8.40 | 4.38 | 6.66 |
| $C_5^+$ Gasoline | 30.8 | 38.5 | 26.7 | 33.5 | 30.0 | 37.6 | 30.3 | 37.9 | 30.3 | 37.8 | 31.4 | 39.1 |
| Light Cycle Oil | 47.9 | 48.4 | 35.2 | 35.5 | 44.1 | 44.2 | 44.1 | 44.2 | 45.8 | 46.1 | 47.7 | 48.2 |
| HCO + MCB | 3.08 | 2.81 | 11.3 | 10.2 | 1.92 | 1.78 | 2.46 | 2.18 | 3.15 | 2.87 | 2.52 | 2.27 |
| Coke | 5.68 | — | 5.38 | — | 6.94 | — | 6.68 | — | 5.68 | — | 5.43 | — |
| Total | 100.0 | 104.8 | 100.0 | 108.8 | 100.0 | 106.0 | 100.0 | 105.5 | 100.0 | 105.4 | 100.0 | 105.1 |
| Potential Alkylate | 19.2 | | 40.9 | | 30.3 | | 28.0 | | 25.3 | | 19.7 | |
| Outside $i-C_4$ Required | 11.2 | | 25.2 | | 18.2 | | 16.7 | | 15.2 | | 11.6 | |
| Potential G + D + A | 106.1 | | 109.9 | | 112.1 | | 112.4 | | 109.2 | | 107.0 | |
| Potential G + A | 57.7 | | 74.4 | | 67.9 | | 65.9 | | 63.1 | | 58.8 | |
| G + D | 86.9 | | 69.0 | | 81.8 | | 82.1 | | 83.9 | | 87.3 | |
| $C_5^+$ Gasoline Analysis | | | | | | | | | | | | |
| RON + O | 92.4 | | 94.3 | | 94.4 | | 93.8 | | 93.7 | | 92.5 | |

TABLE 3

ZSM-5 (0.02–0.05 micron crystallite size) Distillate Mode Yield
From 0.5 BPD Pilot Plant Study

| Base FCC Catalyst | Equilibrium 75-F | | | | | | | | | | | |
|---|---|---|---|---|---|---|---|---|---|---|---|---|
| Time on stream, hrs. | Base Case | | 4 | | 50 | | 72 | | 144 | | 370 | |
| Operating Conditions: | | | | | | | | | | | | |
| Riser Top Temp °F. | 938 | | 941 | | 938 | | 937 | | 938 | | 942 | |
| Regen Temp, °F. | 1330 | | 1337 | | 1336 | | 1337 | | 1336 | | 1335 | |
| Combined Feed Ratio | 1.5 | | 1.5 | | 1.5 | | 1.5 | | 1.5 | | 1.6 | |
| Cat/Oil | 4.3 | | 4.9 | | 5.0 | | 4.1 | | 4.0 | | 4.6 | |
| Conversion (Vol %) | 42.8 | | 53.6 | | 50.3 | | 42.8 | | 42.6 | | 44.2 | |
| Product Yields, % | Wt | Vol | Wt | Vol | Wt | Vol | Wt | Vol | Wt | Vol | Wt | Vol |
| $H_2S$ | 1.08 | — | 1.08 | — | 1.08 | — | 1.05 | — | 1.06 | — | 1.06 | — |
| $H_2$ | 0.10 | — | 0.09 | — | 0.11 | — | 0.10 | — | 0.11 | — | 0.11 | — |
| $C_1$ | 0.80 | — | 0.74 | — | 0.98 | — | 0.77 | — | 0.76 | — | 0.77 | — |
| $C_2$ | 1.52 | — | 1.48 | — | 1.82 | — | 1.51 | — | 1.53 | — | 1.51 | — |
| $C_3$ | 0.73 | 1.34 | 1.04 | 1.91 | 1.01 | 1.85 | 0.83 | 1.51 | 0.81 | 1.49 | 0.81 | 1.48 |
| $C_3=$ | 2.08 | 3.68 | 5.85 | 10.41 | 3.46 | 6.16 | 2.80 | 4.98 | 2.61 | 4.65 | 2.57 | 4.58 |
| $i-C_4$ | 0.70 | 1.15 | 1.43 | 2.36 | 0.97 | 1.60 | 0.73 | 1.21 | 0.68 | 1.12 | 0.75 | 1.24 |
| $n-C_4$ | 0.40 | 0.63 | 0.48 | 0.77 | 0.45 | 0.72 | 0.38 | 0.60 | 0.39 | 0.62 | 0.38 | 0.61 |
| $C_4=$ | 3.20 | 4.88 | 7.48 | 11.42 | 4.89 | 7.47 | 4.00 | 6.11 | 3.82 | 5.83 | 3.89 | 5.94 |
| $C_5^+$ Gasoline | 27.7 | 34.3 | 27.8 | 35.1 | 29.9 | 37.1 | 26.5 | 33.1 | 26.7 | 33.5 | 27.9 | 34.6 |
| LCO | 47.1 | 48.4 | 39.3 | 39.2 | 44.8 | 45.5 | 45.0 | 46.1 | 45.6 | 46.7 | 45.7 | 46.9 |
| HCO + MCB | 9.5 | 8.8 | 7.9 | 7.2 | 4.7 | 4.2 | 11.9 | 11.1 | 11.5 | 10.7 | 9.8 | 8.8 |
| Coke | 5.1 | — | 5.3 | — | 5.8 | — | 4.4 | — | 4.4 | — | 4.8 | — |
| Total | 100.0 | 103.2 | 100.0 | 106.4 | 100.0 | 104.6 | 100.0 | 104.7 | 100.0 | 104.6 | 100.0 | 104.2 |
| Potential Alkylate | 14.3 | | 36.5 | | 22.8 | | 18.6 | | 17.5 | | 17.6 | |
| Outside $i-C_4$ Required | 8.4 | | 22.2 | | 13.7 | | 11.3 | | 10.6 | | 10.6 | |
| Potential G + D + A | 97.0 | | 110.8 | | 105.4 | | 97.8 | | 97.7 | | 99.1 | |
| Potential G + A | 48.6 | | 71.6 | | 59.9 | | 51.7 | | 51.0 | | 52.2 | |
| G + D | 82.7 | | 74.3 | | 82.6 | | 79.2 | | 80.2 | | 81.5 | |
| $C_5^+$ Gasoline Analysis | | | | | | | | | | | | |
| RON + O | 91.6 | | 94.2 | | 92.3 | | 91.9 | | 92.4 | | 92.0 | |

EXAMPLES 6 AND 7

In addition to the aforementioned aging tests (Examples 4 and 5), the effect of ZSM-5 crystal size was demonstrated on a fixed fluidized bed bench unit by comparing fresh and steamed small crystal ZSM-5 of crystallite size 0.02–0.05 microns with fresh and steamed ZSM-5 of crystallite size 0.2–0.5 microns. Results are presented in Tables 4 and 5. In both cases the larger crystal ZSM-5 exhibits greater hydrothermal stability. It is interesting to note that the fresh catalysts exhibit comparable effects in Table 4, whereas in Table 5 the fresh ZSM-5 of larger crystallite size appears somewhat more active.

TABLE 4

Comparison[1] of Fresh and Steamed[2] ZSM-5 Of Varied Crystallite Sizes in Super-D[2] At Constant 3.0 Cat/Oil (20 WHSV hr$^{-1}$)

|  | Super-D | +.25% Fresh ZSM-5 | +.25% Fresh ZSM-5 | +2% Stm'd ZSM-5 | +2% Stm'd ZSM-5 |
|---|---|---|---|---|---|
| ZSM-5 Crystallite size, microns | — | 0.02–0.05 | 0.2–0.5 | 0.02–0.05 | 0.2–0.5 |
| Conversion, % Vol | 70.2 | 69.6 | 67.4 | 69.3 | 67.4 |
| Product Yields: | | | | | |
| $C_5^+$ Gasoline, % Vol | 55.2 | 52.6 | 46.9 | 54.6 | 52.6 |
| Total $C_4$'s, % Vol | 16.1 | 17.6 | 22.1 | 15.9 | 15.1 |
| Dry Gas, % Wt | 7.8 | 8.4 | 10.2 | 7.9 | 7.7 |
| Coke, % Wt | 4.2 | 4.3 | 4.6 | 4.0 | 4.1 |
| Light Fuel Oil, % Wt | 26.1 | 25.8 | 26.4 | 26.7 | 27.9 |
| Heavy Fuel Oil, % Wt | 6.5 | 7.4 | 6.2 | 6.8 | 7.5 |
| G + D, % Wt | 71.3 | 68.7 | 65.0 | 71.2 | 71.0 |
| n-$C_4$, % Vol | 2.2 | 2.2 | 2.4 | 2.1 | 1.8 |
| i-$C_4$, % Vol | 7.2 | 8.2 | 10.7 | 7.1 | 7.1 |
| $C_4^=$, % Vol | 6.7 | 7.2 | 9.0 | 6.7 | 6.2 |
| $C_3$, % Vol | 2.4 | 2.5 | 3.0 | 2.4 | 2.4 |
| $C_3^=$, % Vol | 6.8 | 8.1 | 10.3 | 7.2 | 7.3 |
| Potential Alkylate Yields: | | | | | |
| Alkylate, % Vol | 22.5 | 25.5 | 32.1 | 23.2 | 22.3 |
| $C_5^+$ Gasoline + Alkylate, % Vol | 77.7 | 78.1 | 79.0 | 77.8 | 74.9 |
| Outside i-$C_4$, % Vol | 8.2 | 9.2 | 11.3 | 8.7 | 8.2 |
| Octane Number RON + O: | | | | | |
| $C_5^+$ Gasoline | 86.4 | 88.0 | 88.7 | 87.0 | 88.3 |
| $C_5^+$ Gasoline + Alkylate | 88.6 | 90.0 | 90.8 | 89.1 | 89.9 |

[1]Fixed-Fluidized Bed Bench Unit, 1.0 Minute On-Stream. Reaction Temperature: 960° F.; Feed: JSHGO.
[2]Steamed 10 hrs, 1450° F., 45/55 steam/air, 0 psig.

TABLE 5

Comparison[1] of Fresh and Steamed[2] ZSM-5 Of Varied Crystallite Sizes in Super-D[3] At Constant 2.0 Cat/Oil (30 WHSV hr$^{-1}$)

|  | Super-D | +.25% Fresh ZSM-5 | +.25% Fresh ZSM-5 | +2% Stm'd ZSM-5 | +2% Stm'd ZSM-5 |
|---|---|---|---|---|---|
| ZSM-5 Crystallite size, microns | — | 0.02–0.05 | 0.2–0.5 | 0.02–0.05 | 0.2–0.5 |
| Conversion, % Vol | 66.8 | 67.7 | 67.2 | 66.5 | 65.3 |
| Product Yields: | | | | | |
| $C_5^+$ Gasoline, % Vol | 55.7 | 49.7 | 50.3 | 52.7 | 51.1 |
| Total $C_4$'s, % Vol | 14.0 | 19.3 | 18.4 | 14.9 | 19.0 |
| Dry Gas, % Wt | 6.0 | 7.4 | 7.7 | 7.3 | 6.9 |
| Coke, % Wt | 3.7 | 4.0 | 3.8 | 3.6 | 3.8 |
| Light Fuel Oil, % Wt | 27.2 | 26.4 | 26.9 | 26.6 | 25.8 |
| Heavy Fuel Oil, % Wt | 8.6 | 8.5 | 8.4 | 9.4 | 8.9 |
| G + D, % Wt | 72.7 | 67.7 | 68.3 | 70.2 | 68.2 |
| n-$C_4$, % Vol | 1.8 | 2.2 | 2.1 | 1.8 | 2.1 |
| i-$C_4$, % Vol | 7.1 | 9.3 | 9.0 | 7.0 | 9.1 |
| $C_4^=$, % Vol | 5.1 | 8.1 | 7.3 | 6.0 | 7.9 |
| $C_3$, % Vol | 2.2 | 2.2 | 2.5 | 2.3 | 2.2 |
| $C_3^=$, % Vol | 4.9 | 7.5 | 7.6 | 6.9 | 6.5 |
| Potential Alkylate Yields: | | | | | |
| Alkylate, % Vol | 16.7 | 25.1 | 24.8 | 21.5 | 24.0 |
| $C_5^+$ Gasoline + Alkylate, % Vol | 72.3 | 74.9 | 75.1 | 74.2 | 75.2 |
| Outside i-$C_4$, % Vol | 4.3 | 7.8 | 7.9 | 7.7 | 7.2 |
| Octane Number RON + O: | | | | | |
| $C_5^+$ Gasoline | 84.1 | 87.6 | 87.3 | 85.6 | 86.9 |

TABLE 5-continued

Comparison[1] of Fresh and Steamed[2] ZSM-5 Of Varied Crystallite Sizes in Super-D[3] At Constant 2.0 Cat/Oil (30 WHSV hr$^{-1}$)

|  | Super-D | +.25% Fresh ZSM-5 | +.25% Fresh ZSM-5 | +2% Stm'd ZSM-5 | +2% Stm'd ZSM-5 |
|---|---|---|---|---|---|
| $C_5^+$ Gasoline + Alkylate | 86.4 | 89.8 | 89.5 | 88.0 | 89.2 |

[1]Fixed-Fluidized Bed Bench Unit, 1.0 Minute On-Stream. Reaction Temperature: 960° F.; Feed: JSHGO.
[2]Steamed 10 hrs, 1450° F., 45/55 steam/air, 0 psig.
[3]Steamed 4 hrs, 1400° F., 100% steam, 0 psig.

The Joliet Sour Heavy Gas Oil, JSHGO, feed properties are set forth below in Table 6:

TABLE 6

| Chargestock | Joliet Sour Heavy Gas Oil |
|---|---|
| Gravity, °API | 24.3 |
| Density, g/cc | 0.91 |
| Aniline Pt. °F./°C. | 171/77 |
| Sulfur, Wt % | 1.87 |
| Nitrogen, Wt. % | 0.10 |
| Basic Nitrogen, ppm | 327 |
| Conradson Carbon, Wt % | 0.28 |
| Viscosity, KV at 210° F./99° C. | 3.6 |
| Bromine No. | 4.2 |
| R.I. at 70° F./21° C. | 1.5080 |
| Hydrogen, Wt % | 12.3 |
| Molecular Weight | 358 |
| Pour Point, °F./°C. | 85/29 |
| Paraffins, Wt % | 23.5 |
| Naphthenes, Wt % | 32.0 |
| Aromatics, Wt % | 44.5 |
| CA, Wt % | 18.9 |

EXAMPLE 8

To demonstrate utility of the present invention in TCC, two bead catalysts were made to comprise: first, 8.5 wt. percent REY and 4.4 wt. percent ZSM-5 having a crystal size of 1 micron; and second, 8.5 wt. percent REY and 4.2 wt. percent ZSM-5 having a crystal size of 0.02–0.03 micron. The two bead catalysts were evaluated for TCC performance in the standard CAT-D test at 900° F. Reactor conditions included total catalyst fines of 42 percent for each, packed densities of 0.92 g/cc for the first catalyst and 0.93g/cc for the second catalyst, and diffusivities (cm$^2$/sec)10$^3$ of 21 for the first catalyst and 20 for the second catalyst.

Reaction conditions and results are listed in Table 7:

TABLE 7

Comparison of Bead Catalysts

| Catalyst | First REY + 4.4% 1 micron ZSM-5 | Second REY + 4.2% 0.02–0.03 micron ZSM-5 |
|---|---|---|
| Conversion, % vol. | 67.6 | 66.6 |
| $C_5^+$ Gasoline, % vol. | 48.4 | 49.7 |
| $C_4$'s, % vol. | 19.3 | 17.9 |
| Dry Gas, % wt. | 8.3 | 7.3 |
| Coke, % wt. | 3.5 | 3.6 |
| Gasoline Efficiency, % | 71.6 | 74.6 |
| $H_2$, % wt. | .03 | .02 |
| $C_1$, % wt. | .55 | .52 |
| $C_2^=$, % wt. | .58 | .52 |
| $C_2$, % wt. | .47 | .49 |
| $C_3^=$, % wt. | 4.56 | 3.92 |
| $C_3$, % wt. | 2.12 | 1.83 |
| $iC_4$, % vol. | 10.40 | 9.29 |
| $C_4^=$, % vol. | 6.96 | 6.52 |
| $nC_4$, % vol. | 1.91 | 2.10 |
| $iC_5$, % vol. | 8.06 | 7.33 |
| $C_5^=$, vol. | 3.67 | 3.02 |
| $nC_5$, % vol. | .44 | .66 |
| $C_6^=$, % vol. | 36.17 | 38.17 |
| Available for Alkylation: | | |
| $iC_4$, % vol. | 10.2 | 9.1 |
| $C_3^=$, % vol. | 7.0 | 6.0 |
| $C_4^=$, % vol. | 6.8 | 6.4 |
| Alkylate, % vol. | 24.4 | 21.9 |
| Outside $iC_4$, % vol. | 6.3 | 5.7 |
| O.N. (R + O), $C_5$+ Gasoline | 92.3 | 91.4 |
| $C_5^+$ gasoline + Alkylate, % vol. | 72.8 | 71.7 |
| O.N. (R + O), Final | 92.8 | 92.2 |
| Adjusted to 68.2% Conversion: | | |
| $C_5^+$ Gasoline, % vol. | 48.7 | 50.4 |
| $C_5$ Gasoline + Alkylate, % Vol. | 73.1 | 72.4 |

What is claimed is:

1. In a process for catalytic cracking of a petroleum fraction in the presence of a conventional cracking catalyst, under cracking conditions and wherein the catalyst is contacted with steam, the improvement comprising adding to said catalyst an additive catalyst comprising zeolite characterized by a Constraint Index of from about 1 to about 12 and a silica/alumina mole ratio greater than about 12 in an amount which provides the zeolite component of said additive catalyst at from about 0.1 wt. percent to about 50 wt. percent of said conventional cracking catalyst, said additive catalyst zeolite having a crystal size of from 0.2 micron to 10 microns.

2. The process of claim 1 wherein said catalysts are fluidizable microspheres and said process is fluid catalytic cracking.

3. The process of claim 1 wherein said catalysts are beads or pellets and said process is Thermofor catalytic cracking.

4. The process of claim 1 wherein the additive catalyst zeolite has a crystal size of from 0.2 to 5 micron.

5. The process of claim 1 wherein the additive catalyst zeolite has a crystal size of from 0.3 to 3 micron.

6. The process of claim 1 wherein said additive catalyst is added in an amount which provides the zeolite component of said additive catalyst at from about 0.1 wt. percent to about 20 wt. percent of the conventional cracking catalyst.

7. The process of claim 1 wherein said additive catalyst zeolite is at least one member selected from the group consisting of ZSM-5, ZSM-11, ZSM-12, ZSM-23, ZSM-35 and ZSM-38.

8. The process of claim 1 wherein said additive catalyst zeolite has the structure of ZSM-5.

9. The process of claim 1 wherein said conventional cracking catalyst comprises a zeolite selected from the group consisting of zeolite X, zeolite Y, and naturally occurring faujasite.

10. The process of claim 9 wherein said conventional cracking catalyst zeolite has the structure of zeolite Y.

11. The process of claim 1 wherein a metal selected from the group consisting of platinum, palladium, iridium, osmium, rhodium, ruthenium and rhenium is added in an amount of from about 0.01 ppm to about 100 ppm, based on the total catalyst inventory, in order to enhance carbon monoxide conversion.

12. A process for catalytically cracking a petroleum fraction comprising:
(A) contacting said petroleum fraction as feed, under cracking conditions, with a catalyst composition comprising
(1) a large pore zeolite and
(2) an additive component comprising a zeolite having a Constraint Index of about 1 to about 12, having a silica to alumina mole ratio greater than about 12 and having a crystal size from 0.2 to 10 microns and exhibiting hydrothermal stability to steam,
wherein the catalyst composition is exposed to contact with steam during the cracking process, whereby the gasoline octane number and gasoline plus alkylate yield are improved by the use of said additive component of improved hydrothermal stability.

13. The process of claim 12, wherein said zeolite of Constraint Index of about 1 to about 12 comprises from about 0.1 to about 50 weight percent of said catalyst composition.

14. The process of claim 12 wherein the catalyst composition is exposed to contact with said steam when said steam is present in the feed.

15. The process of claim 12 wherein the catalyst composition is exposed to contact with said steam when said steam is produced under said cracking conditions.

16. The process of claim 12, wherein the catalyst composition is exposed to contact with said steam when said steam is added to remove products and unreacted feed from said catalyst.

17. The process of claim 12, wherein the catalyst composition is exposed to contact with said steam when said steam is present during catalyst regeneration.

18. A process for catalytically cracking a petroleum fraction comprising
(A) contacting said petroleum fraction as feed, under cracking conditions, with a catalyst composition comprising
(1) a large pore zeolite and
(2) zeolite of ZSM-5 structure having a silica to alumina mole ratio greater than about 12 and having a crystal size from 0.2 to 10 microns and thereby exhibiting hydrothermal stability to steam,
wherein the catalyst composition is exposed to contact with steam during the cracking process, whereby the gasoline octane number and gasoline plus alkylate yield are improved by the use of said zeolite of ZSM-5 structure of improved hydrothermal stability.

19. The process of claim 18, wherein said ZSM-5 comprises from about 0.1 to about 50 weight percent of said catalyst composition.

20. The process of claim 18, wherein the catalyst composition is exposed to contact with said steam when said steam is present in the feed.

21. The process of claim 18, wherein the catalyst composition is exposed to contact with said steam when said steam is produced under said cracking conditions.

22. The process of claim 18, wherein the catalyst composition is exposed to contact with said steam when said steam is added to remove products and unreacted feed from said catalyst.

23. The processes of claim 18, where the catalyst composition is exposed to contact with said steam when said steam is present during catalyst regeneration.

24. A process for catalytically cracking a petroleum fraction comprising
(A) contacting said petroleum fraction as feed, under cracking conditions, with a catalyst composition comprising
(1) zeolite X or zeolite Y
(2) an additive component comprising a zeolite having a Constraint Index of about 1 to about 12, having a silica to alumina mole ratio greater than about 12 and having a crystal size from 0.2 to 10 microns and thereby exhibiting hydrothermal stability to steam,
wherein the catalyst composition is exposed to contact with steam during the cracking process, whereby the gasoline octane number and gasoline plus alkylate yield are improved by the use of said additive component of improved hydrothermal stability.

25. The process of claim 24, wherein said zeolite having a Constraint Index of about 1 to about 12 comprises from about 0.1 to about 50 weight percent of said catalyst composition.

26. The process of claim 24, wherein said zeolite of Constraint Index of about 1 to about 12 has the structure of ZSM-5.

27. The process of claim 24, wherein said zeolite Y is in its ultrastable form.

28. The process of claim 26, wherein said zeolite Y is in its ultrastable form.

29. The process of claim 24, wherein the catalyst composition is exposed to contact with said steam when said steam is present in the feed.

30. The process of claim 24, wherein the catalyst composition is exposed to contact with said steam when said steam is produced under said cracking conditions.

31. The process of claim 24, wherein the catalyst composition is exposed to contact with said steam when said steam is added to remove products and unreacted feed from said catalyst.

32. The process of claim 24, wherein the catalyst composition is exposed to contact with said steam when said steam is present during catalyst regeneration.

* * * * *